Oct. 14, 1958
C. R. STEBER
2,856,087
TELESCOPIC BOOM BOAT TRAILER
Filed Jan. 8, 1957
2 Sheets-Sheet 1
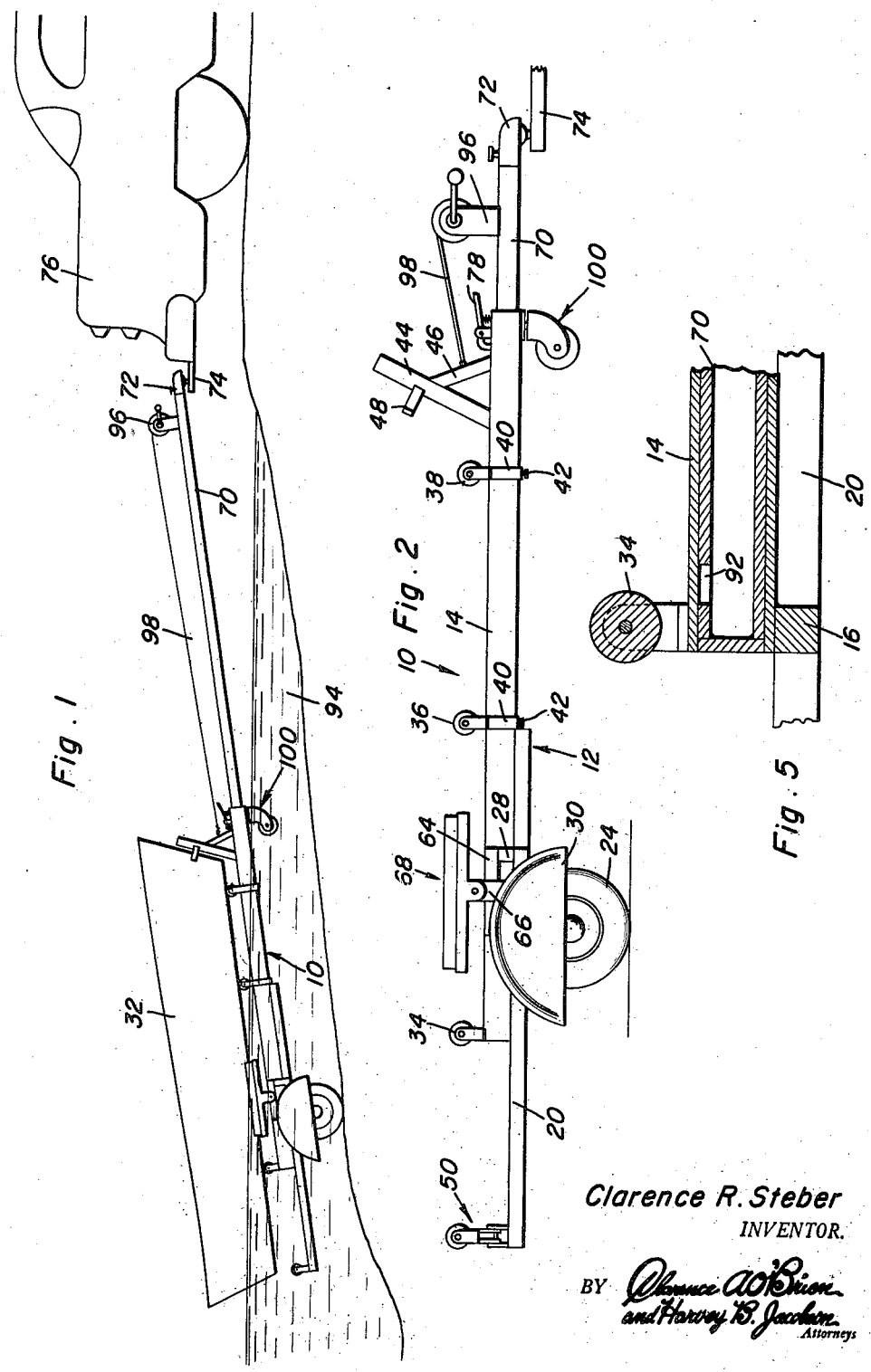
Clarence R. Steber
INVENTOR.

Oct. 14, 1958
C. R. STEBER
2,856,087
TELESCOPIC BOOM BOAT TRAILER
Filed Jan. 8, 1957
2 Sheets-Sheet 2
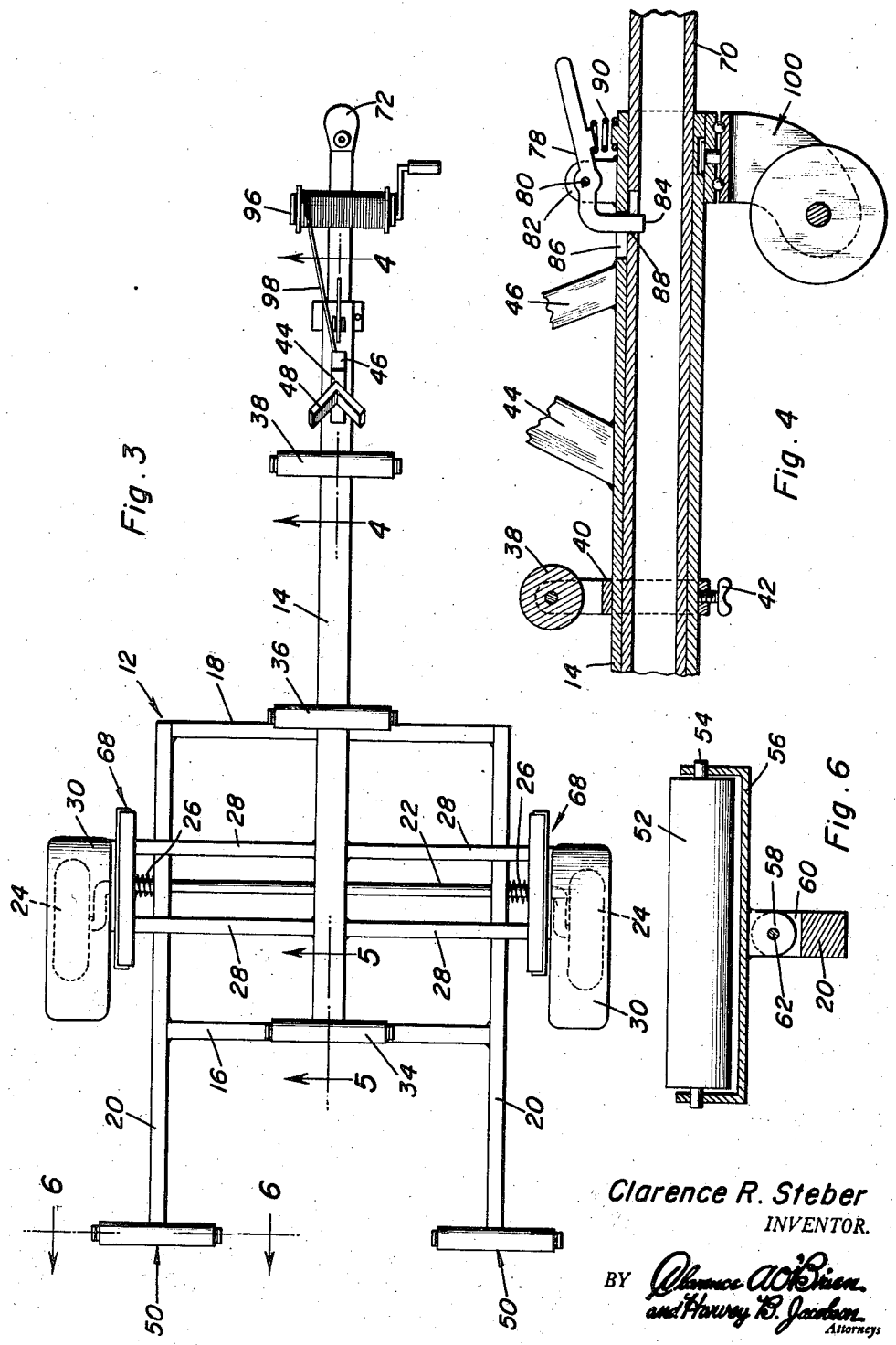
Clarence R. Steber
INVENTOR.

United States Patent Office 2,856,087
Patented Oct. 14, 1958

2,856,087

TELESCOPIC BOOM BOAT TRAILER

Clarence R. Steber, Biloxi, Miss.

Application January 8, 1957, Serial No. 633,028

1 Claim. (Cl. 214—84)

This invention relates in general to new and useful improvements in trailer construction, and more specifically to an improved boat trailer.

In order that a boat may be properly carried on a trailer behind an automobile, it is desirable that the trailer be hitched as closely as possible to the vehicle. On the other hand, when the trailer is being used to either launch the boat or to remove it from the water, it is desired that the trailer be in a position whereby the boat may be placed thereon or removed therefrom at the same time the towing vehicle remains on dry ground. Heretofore attempts have been made to provide an extensible tow pole. However, these attempts have met with little success because in the instance of drawing the boat from the water, the trailer is spaced from the towing vehicle and it is then difficult to retract the tow pole because of the load placed thereupon. Also, heretofore extensions of the tow pole have been relatively small thus not affording the advantages actually desired.

It is therefore the primary object of this invention to provide an improved boat trailer which has a frame construction of such a nature whereby the tow pole extends a relatively great length within the frame so that the extension of the tow pole, when desired, is relatively great and sufficient to permit the launching and retraction of a boat while the trailer is in the water and the towing vehicle is on dry land.

Another object of this invention is to provide an improved trailer construction for hauling boats, the trailer construction including a frame having a central frame member, there being telescoped in the central frame member and extending forwardly therefrom an elongated tow pole, the tow pole being extensible out of the central frame member and extending substantially the full length of the central frame member whereby a tow pole of a maximum width, when extended, is possible.

A further object of this invention is to provide an improved trailer construction for hauling boats, the trailer construction including a frame having an extensible tow pole, the tow pole being provided with a winch connected to the frame so that the tow pole may be retracted utilizing the winch even though the trailer is loaded with a boat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the trailer which is the subject of this invention and shows the trailer attached to a vehicle in position for either launching of a boat or removal of the boat from the water, the tow pole of the trailer being extended to facilitate this operation while the towing vehicle remains on dry land;

Figure 2 is an enlarged side elevational view of the trailer of Figure 1 with the boat removed therefrom and the tow pole in a retracted position;

Figure 3 is an enlarged plan view of the boat trailer as it appears in Figure 1 and shows the general arrangement of the boat supports carried by the frame of the trailer;

Figure 4 is an enlarged fragmentary longitudinal sectional view taken substantially upon the plane indicated by the section line 4—4 of Figure 3 and shows the specific details of a latch construction for retaining the tow pole in a retracted position;

Figure 5 is an enlarged fragmentary longitudinal sectional view taken substantially upon the plane indicated by the section line 5—5 of Figure 3 and shows the construction in the rear part of the tow pole to facilitate the latching thereof in an extended position; and Figure 6 is an enlarged transverse sectional view taken substantially upon the plane indicated by the section line 6—6 of Figure 3 and shows the details of the boat support.

Referring now to the drawings in detail, it will be seen that there is illustrated the boat trailer which is the subject of this invention, the boat trailer being referred to in general by the reference numeral 10. The boat trailer 10 includes a frame which is referred to in general by the reference numeral 12. The frame 12 is formed of an elongated centrally located, longitudinally extending frame member 14. The frame member 14 forms the backbone of the frame 12 and has secured to the rear end portion thereof a transverse frame member 16. The similar transverse frame member 18 is secured to an intermediate part of the frame member 14. Coupling together the frame members 16 and 18 at the outer ends thereof are longitudinal frame members 20 which extend rearwardly beyond the transverse frame member 16, and the frame member 14.

Extending transversely of the frame 12 is an axle 22 of the cranked type which has mounted on the outer ends thereof reels 24 for supporting the frame. The axle 22 is journaled relative to the longitudinal frame members 20 and the frame 12 is retained in a load sustaining position by means of spring members 26 carried by the axle 22 and connected between the axle 22 and the frame members 20.

It is to be noted that the frame 12 is reinforced in the vicinity of the axle 22 by means of pairs of transverse frame members 28 which extend from opposite sides of the frame member 14 to the longitudinal frame member 20. The transverse frame members 28 are disposed longitudinally on opposite sides of the axle 22 and extend beyond the frame members 20 to form supports for fenders 30 for the individual wheels 24. In order to facilitate the mounting of a boat, such as the boat 32 illustrated in Figure 1, on the frame 12, there is provided a plurality of boat supports of the roller type. The boat supports include three rollers on the frame member 14. The rearmost of the three rollers is referred to by the reference numeral 34 and is mounted at the rear end of the frame 14. An intermediate roller 36 is mounted on the frame member 14 ahead of the transverse frame member 18. A forward roller 38 is mounted on the frame member 14 rearwardly of the forward end thereof. It is to be noted that the rollers 36 and 38 are adjustably mounted on the frame member 14 for selective positioning. This is accomplished by providing the rollers 36 and 38 with supports including a collar 40 telescoped over the frame member 14 and adjustably secured thereon by means of a setscrew 42, as is best illustrated in Figure 4. Extending upwardly from the forward part of the frame member 14 is a support 44 which is braced by a diagonal brace 46. The support 44 carries a V-shaped bow engaging member 48 to facilitate the positioning of the bow of the boat 32.

Carried by the rear end of the frame member 20 are transversely extending roller assemblies which are referred to in general by the reference numeral 50. The roller assemblies 50 each include a roller 52 having a shaft 54. The shaft 54 has opposite ends thereof journaled in a U-shaped bracket 56, as is best illustrated in Figure 6, and the bracket 56 is supported for pivotal movement about a longitudinal axis through an ear 58 secured thereto and a similar ear 60 carried by the frame member 20. The ears 58 and 60 are pivotally connected together by means of a pivot bolt 62 which extends longitudinally of the frame 12.

The outer ends of the transverse frame members 28 are connected together by frame members 64, as is best illustrated in Figure 2. Extending upwardly from the frame members 64 are supports 66 carrying longitudinally extending roller assemblies 68. The longitudinally extending roller assemblies 68 are identical with the roller assemblies 50 except for size and position.

From the foregoing description of the trailer 10, it will be readily apparent that there has been provided adequate means for supporting the boat 32 on the boat trailer 10 and means for supporting the frame of the boat trailer with respect to the ground. In order that the boat trailer 10 may be towed, there is provided a tow pole which is referred to by the reference numeral 70. The longitudinal frame member 14 is of a tubular construction and telescoped therein is a major portion of the tow pole 70, the tow pole 70 extending substantially the full length of the frame member 14, as is best illustrated in Figure 5. The forward end of the tow pole 70 is provided with a hitch member 72 for attachment to a complementary hitch member 74 of a towing vehicle 76.

Referring now to Figure 4 in particular, it will be seen that carried by the forward end of the frame member 14 is a latch member 78 which is carried by a transverse pivot member 80 supported by ears 82 extending upwardly from the frame member 14. The latch member 78 includes a detent or finger 84 which passes down through an opening 86 in the forward part of the frame member 14 and is selectively positioned in opening 88 in a forward part of the tow pole 70 to retain the tow pole 70 in a retracted position. The latch member 78 is spring urged into a tow pole retaining position by means of a spring 90. In order to prevent the tow pole 70 from being pulled entirely out of the frame member 14 when the tow pole 70 is being extended, the rear part of the tow pole 70, as is best illustrated in Figure 5, is provided with an opening 92 for reception of detent of finger 84. It is to be noted that the opening 92 is so shaped whereby the finger 84 will automatically fall therein and prevent further retraction of the tow pole 70 unless the latch member 78 is manually released.

When the boat 32 is being towed from place to place, the tow pole 70 will be retracted as is best illustrated in Figure 2. This permits ease of handling of the trailer 10.

On the other hand, when it is desired to launch the boat 32 or be removed from the water, the tow pole 70 is extended to its maximum length, as is best illustrated in Figure 1. This permits the boat trailer 10 to be properly positioned within water, such as the water 94, while the towing vehicle 76 remains on dry land. This is highly desirable inasmuch as it permits the launching and removal of a boat without the possibility of the towing vehicle becoming stuck or necessitating the uncoupling of the boat trailer 10 from the vehicle 76 and the manual pushing of the boat trailer into the water or withdrawing it therefrom.

When there is no load on the trailer 10, the tow pole 70 may be retracted with relative ease. On the other hand, when the boat trailer 10 is loaded with a boat, such as the boat 32, there is a bending movement of the tow pole 70 and it is difficult to retract. In order to accomplish the retraction of the tow pole 70 with ease, there is mounted on the forward part of the tow pole 70 between the frame member 14 and the hitch member 72 a winch 96. The winch 96 is provided with a cable 98 which is attached to the base 46. By operating the winch 96, the telescoping of the tow pole 70 is readily accomplished.

It is to be noted that the forward end of the frame member 14 is provided with a front swivel wheel assembly 100. The swivel wheel assembly 100 may be of any desired type and, if not desired, may be eliminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A boat trailer comprising a frame, supporting wheels attached to said frame, means for supporting a boat carried solely by said frame, said frame including a centrally located longitudinally extending frame member, said frame member being tubular, a tow pole telescoped within said frame member, hitch means on said tow pole for attachment to a towing vehicle, and winch means extending between said tow pole and said frame member for retracting said tow pole.

References Cited in the file of this patent

UNITED STATES PATENTS

| | | |
|---|---|---|
| 2,374,383 | Sampsell | Apr. 24, 1945 |
| 2,708,045 | Shontz | May 10, 1955 |
| 2,765,942 | Niemeier | Oct. 9, 1956 |
| 2,774,612 | Evans | Dec. 18, 1956 |
| 2,789,713 | Agricola | Apr. 23, 1957 |